United States Patent Office 3,580,840
Patented May 25, 1971

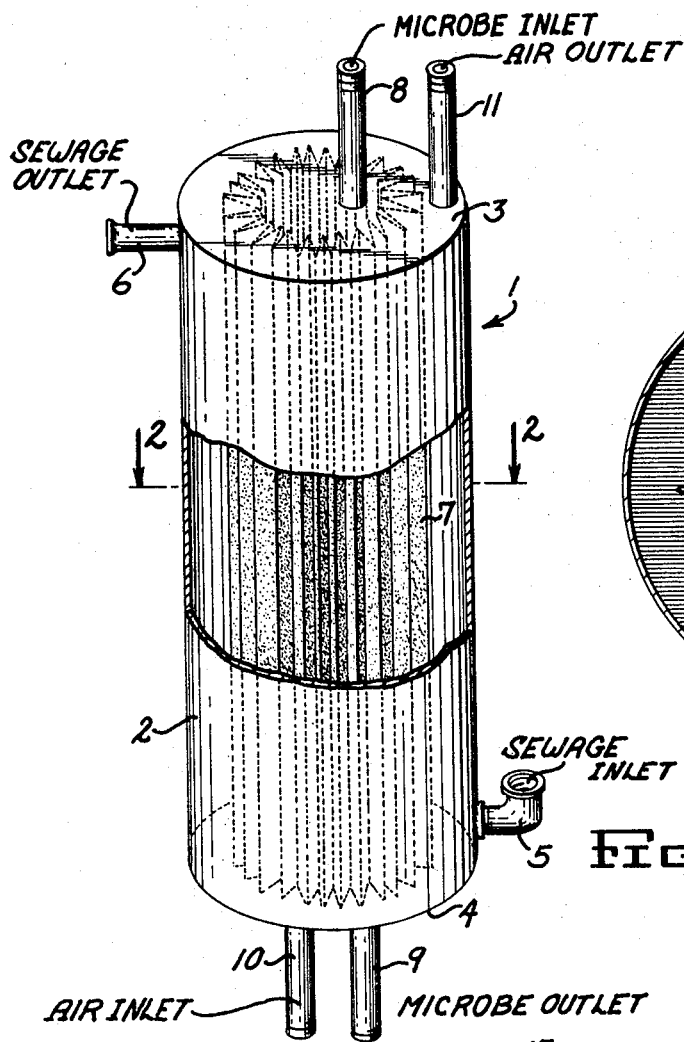
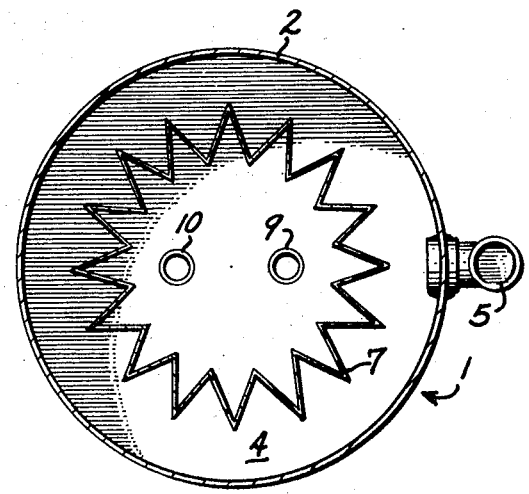
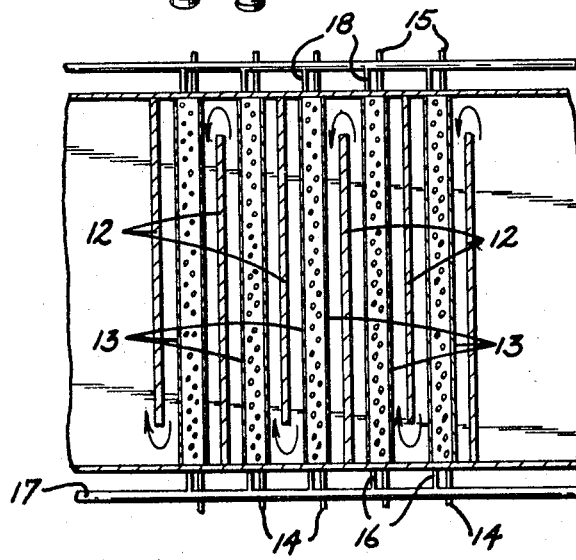

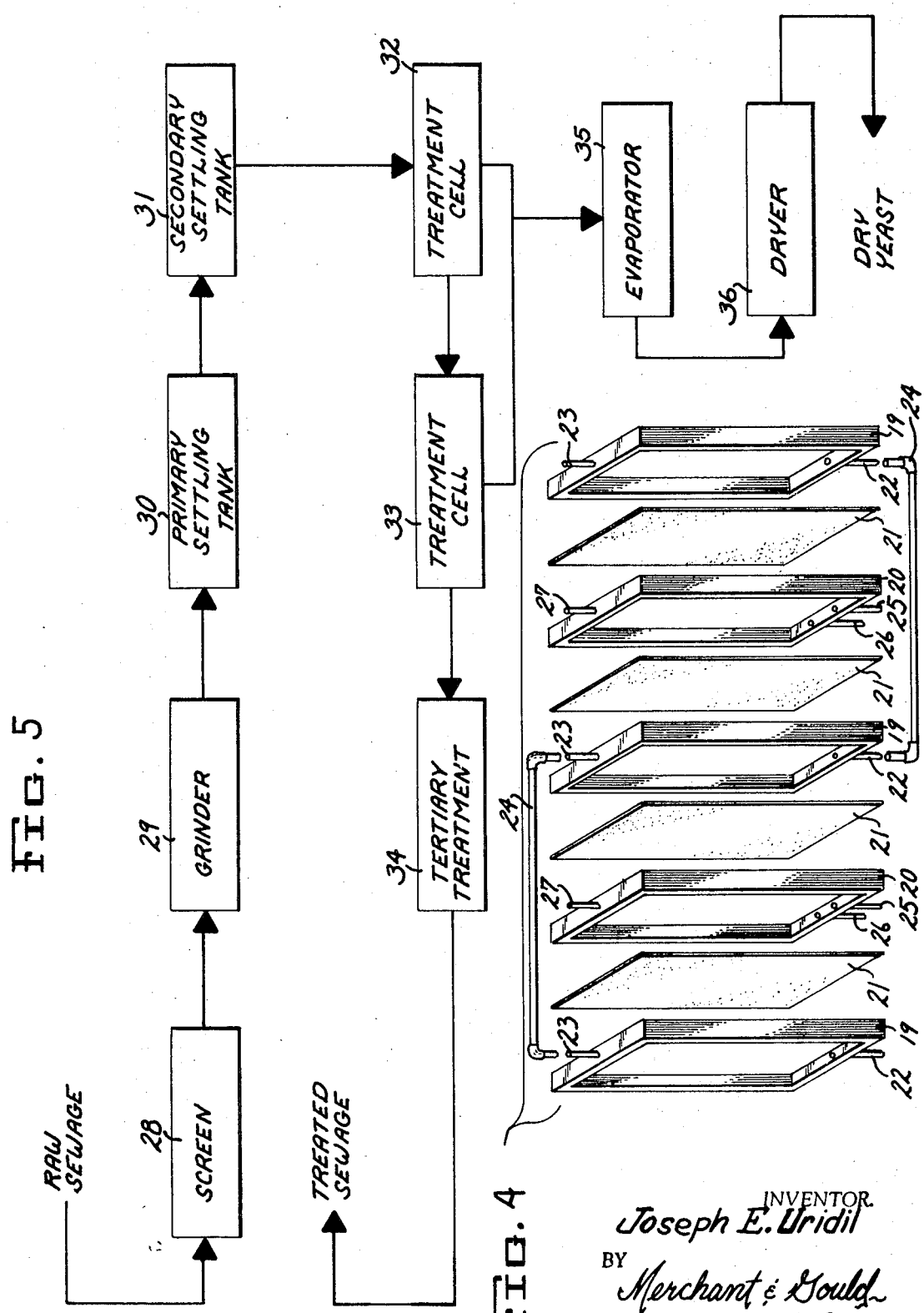

3,580,840
PROCESS FOR TREATING SEWAGE AND OTHER CONTAMINATED WATERS
Joseph E. Uridil, St. Paul, Minn., assignor to Litton Systems, Inc., Beverly Hills, Calif.
Filed Mar. 18, 1969, Ser. No. 808,267
Int. Cl. C02c 1/02
U.S. Cl. 210—11                      9 Claims

ABSTRACT OF THE DISCLOSURE

Sewage and other chemically impure waters are made cleaner by a process which involves the removal or extraction from the water of various contaminants by the controlled growth of selected microorganisms using the sewage or other impure water as the basic growth substrate. The microorganisms (both as the inoculant and as the growth product) are isolated from the sewage or other contaminated water by means of a porous membrane or barrier of restricted pore size (e.g. 0.8–2 microns). These pores are large enough to permit molecules of the contaminants to pass through or penetrate the porous barrier to thereby contact and be acted upon or assimilated by the microorganisms. These pores are small enough to prevent the large scale escape or mass migration of the microorganisms through the membrane into the contaminated water. As a result of the process, one or more contaminants in the waste water are consumed in the microbial metabolism or growth process, thereby making the water cleaner.

BACKGROUND OF THE INVENTION

Water is frequently contaminated or polluted with various organic and inorganic materials as a result of natural phenomenon (e.g. soil erosion) and from urban and industrial use (e.g. as in toilets).

For many years, natural waterways (e.g. rivers) were commonly used as discharge sites for untreated sewage. However, the sad lessons of experience have shown that when sewage is introduced into waterways without any treatment, it can ruin the waterways for other purposes by altering the normal bionomics. For example, as more and more sewage is introduced into the waterway, the waterway tends to fill with silt and become less suitable for navigation, the dissolved oxygen of the water is reduced (which results in a corresponding change in the fish population), algae and other aquatic plants grow in profusion making swimming and boating unpleasant, the waterway loses its aesthetic appeal, and there is a danger of spreading such diseases as typhoid fever and dysentary.

For these and other reasons, sewage treatment plants have been erected in many locales. The purpose of such sewage treatment plants is to partially clean the sewage (e.g. by removing eutrifying chemicals) before diluting it by discharging it into a natural body of water (e.g. a river). The extent to which sewage is partially cleaned is the result of a compromise based upon a consideration of such competing factors as the cost of sewage treatment, the nature of the contaminants in the sewage, and the competing interests for the receiving body of water (e.g. a river). These competing uses for rivers and other natural waterways include domestic water supply, industrial process water, swimming, fishing, boating, barge transportation, sewage dilution, stock watering, irrigation, and others. All cannot be accommodated in full in each stretch of a river because some uses are inconsistent with other uses.

In recent years, there has been a trend toward viewing sewage treatment as one aspect of a program of resource management. Once the desired uses of rivers and other natural waterways are agreed upon, water standards are set at federal, state and local levels. These standards describe the quality of the water in terms that are consistent with the desired uses of the waterway. The last step in such a program is the design of systems of sewage treatment, water supply, and the like which are consistent with the established water standards. However, the present state of the art relating to sewage treatment processes continues to be a major limiting factor (both economically and technically) to the full utilization of natural waterways.

At the present time, sewage treatment systems are commonly categorized by reference to the major steps of sewage treatment and the extent to which the sewage is treated.

"Primary treatment" of sewage is essentially one of physical separation of contaminants from the water. In the primary treatment processes, the flow of sewage is usually changed from a relatively rapid rate in sewers to a relatively slow rate or even to quiescence in ponds or settling tanks to thereby permit sand, cinders, and other particulate or water immiscible matter to settle to the bottom of the treating zone (i.e. sedimentation) or float (e.g. grease will float), depending upon the density of the sewage particles. Screens or gratings can also be used to remove large objects (e.g. boards, bottles, etc.). Sometimes the process is aided by grinding to reduce the particle size of soft organic masses suspended in the sewage. Thus, waste materials are removed from the sewage by, for example, skimming floating particles or liquids from the top of a settling pond, by coarse filtration, or by the removal of sediment from the bottom of a settling basin.

"Secondary treatment" involves the removal of dissolved and suspended organic and inorganic matter through the use of microbial processes which are often aerobic in nature. Secondary sewage treatment processes are essentially accelerated natural processes which would otherwise take place in the receiving water (e.g. the river). In secondary treatment, volunteer or naturally occurring microorganisms entrained in the sewage are allowed to grow in the sewage, thereby utilizing the organic and inorganic contaminants in the sewage to proliferate the microorganisms and to form such by-products as carbon dioxide. The action of these microorganisms is hastened by, for example, the use of activated sewage sludge and aeration. Sludge which is formed as a result of these microbial processes is then physically removed from the treated sewage (e.g. by sedimentation or filtration).

"Tertiary treatment" involves the additional step of adding chemicals (e.g. chlorine) to the aqueous effluent from secondary sewage treatment plants to inactivate pathogenic microorganisms which may be contained therein (e.g. coliform bacteria) or involves specialized processes to remove specific contaminants (e.g. remove certain phosphates).

Most sewage treatment plants in operation at the present time perform primary treatment or a combination of primary and secondary treatments. Although there is an increasing trend toward the additional use of tertiary treatment, its use is not yet widespread.

The efficiency of sewage treatment plants varies from plant to plant. Efficiency can be measured in many ways, but one of the more common methods for measuring efficiency is by reference to the results of a well known standardized test which indicates the biological oxygen demand (BOD). This test indicates the amount of metabolizable contaminants available to aerobic microorganisms present in sewage by determining the amount of oxygen utilized by the microorganisms while consuming or metabolizing these impurities under standardized conditions. Efficiency is then indicated as a percent reduction in BOD and by the BOD of the sewage plant effluent.

Among the various disadvantages of present commercial sewage treatment practices are the following:

(1) They require large permanent facilities and do not lend themselves to adaptation as mobile treatment plants.

(2) The microorganisms which are used in the secondary treatment processes comprise a volunteer, heterogeneous mixture which is limited in its ability to utilize or break down troublesome contaminants such as hard detergents, pesticides, and certain other industrial wastes.

(3) The microorganisms grow in the sewage during secondary treatment and many remain in the sewage and are discharged with the treated sewage into the receiving water (e.g. a river).

(4) In general, it has not been considered practical to add missing or deficient nutrients to the sewage to thereby obtain the nutrient balance which would be needed for substantially complete utilization of the particular nutrients found in the sewage as contaminants.

(5) Sewage treatment facilities must generally be located in remote or non-residential areas because of the stench and insect infestation associated with them.

SUMMARY OF THE INVENTION

It has now been discovered that sewage and other contaminated water inherently containing one or more nutrients for microbial growth can be treated by a process which involves extracting or removing the contaminants from the water with selected microorganisms which are confined or isolated from or within the treating system by a porous membrane or barrier.

According to this invention, contaminated water is introduced (continuously or intermittently) into a zone of treatment which is bounded in part at least by a porous membrane or barrier which is in contact with the contaminated water. A microorganism (e.g. a yeast) is introduced (continuously or intermittently) into a microbial growth zone bounded in part at least by the porous membrane, the microorganism being in liquid contact with said membrane; and at least one contaminant is removed from the contaminated water by utilizing the contaminant as a nutrient in the growth or metabolism of the microorganism (i.e. conditions promoting or permitting microbial growth are created or maintained in the microbial growth zone during treatment). The pores of the membranes or other porous barriers are large enough to permit the organic and inorganic contaminants in the water to penetrate the membrane, yet small enough to prevent substantial leakage or mass migration of microorganisms back into the contaminated water. The process can be conducted batch-wise or continuously.

In operation, the organic and inorganic contaminants (particularly those in solution) in the sewage or other contaminated water rapidly penetrate through the porous barrier and are quickly converted by the microorganisms into microbial products or by-products. By the use of known and frequently pure species of microorganisms (e.g. the yeast *Candida utilis*), it is possible to obtain microbial growth products having recognized commercial value. Moreover, by the use of known species and strains of microorganisms, the growth factors or nutrients present as contaminants in the water being treated can be balanced (e.g. by the intentional addition of missing or deficient nutrients) to thereby permit the nutrients present as contaminants in the water to be removed virtually to extinction. By the use of several different microorganisms, each protected or restrained by its own porous barrier, it is possible to remove a broad spectrum of contaminants from waste water and to do so without introducing or releasing the microbial growth products into the water being treated.

The present process offers the following advantages over present sewage treatment processes:

(a) it has a high degree of flexibility and can be adapted to the successful treatment of many types of contaminated water (e.g. even saline solutions);

(b) the microbial growth products (e.g. yeast) do not remain in the water being treated but we kept isolated and can be recovered for use as, for example, ingredients in animal feeds:

(c) it can be adapted to mobile operation (e.g. by mounting the entire system on a flat-bed truck) to provide treating services where it is not necessary or possible to timely construct permanent facilities;

(d) marketable by-products can be produced (e.g. yeast or anti-biotics); and (e) an unusually high degree of efficiency can be obtained (e.g. 95% or more reduction in BOD).

THE DRAWINGS

FIG. 1 is a perspective view of one type of treatment cell that can be used in the practice of this invention.

FIG. 2 is a cross-sectional view of the apparatus of FIG. 1 taken along the line 2—2 in the direction of the arrows.

FIG. 3 is a side view of a multi-staged treating cell for use in the practice of this invention.

FIG. 4 is an exploded view of a plate and frame type treatment cell which can be used in the practice of this invention.

FIG. 5 is a flow diagram of an integrated sewage treatment process constructed according to this invention.

DETAILED DESCRIPTION

The process of this invention is one for treating sewage and other waste waters by removing contaminants from such wastes by the use of selected microorganisms. The process involves passing sewage or other contaminated water around or through and in liquid contact with a porous barrier which confines selected microorganisms within a microbial growth zone. Conditions favoring microbial growth are maintained within the microbial growth zone, the contaminants are converted to microbial growth products, and water is removed from the system (which water is cleaner than the sewage or other contaminated water which entered the system).

In one preferred application, an improved municipal sewage treatment process is obtained by using the process of this invention in place of conventional secondary treatment methods.

In FIG. 1, apparatus is shown which is suitable for the batch or continuous treatment of sewage in a single stage using one microorganism or a known mixture thereof. The treatment cell, generally designated by the numeral 1, comprises a cylindrical outer shell 2 having a top cover 3 and a bottom cover 4, both in fluid sealing relationship with outer shell 2. Shell 2 is provided with a sewage inlet 5 and a sewage outlet 6. Disposed within outer shell 2 is a tubular, pleated, porous membrane 7 which is held in position by means of upper cover 3 and lower cover 4, and is in fluid sealing relationship with both of said covers. The relationship of membrane 7 to shell 2 is shown in more detail in FIG. 2. Treatment cell 1 is further provided with means 8 for introducing a selected microorganism into the cavity or microbial growth zone within membrane 7, and for maintaining the system at a pre-selected pressure (usually atmospheric). A means 9 is also provided for withdrawing the microbial product from the microbial growth zone within membrane 7. Means 10 are provided for introducing air or oxygen into the center cavity of membrane 7 (i.e. into the microbial growth zone). Exhaust means 11 are provided for venting the annular cavity between shell 2 and membrane 7. Ordinarily, various valve and other control means (not shown) will be used to regulate the flow of materials through conduits 5, 6, 8, 9, 10 and 11.

In a typical batch operation, an inoculating amount of a microorganism (e.g. a culture of *Geotrichum candidum*) is introduced into the treatment cell 1 through conduit 8 into membrane tube 7. Sewage is introduced through conduit 5 into the annular cavity between shell 2 and membrane 7. Air is passed through conduit 10 and permitted to bubble through the growing microorganism to provide both aeration and agitation. The microorganism grows by feeding on the contaminants in the sewage which freely pass through barrier 7 into the microbial growth zone. The process is continued until the desired degree of treatment has been obtained. Then, the microbial product is withdrawn from within membrane 7 through outlet 9 and the cleaned sewage is withdrawn from the treatment cell 1 through conduit 6.

If it is desired to operate the process continuously as opposed to batch, sewage can be continuously passed through the annular cavity or feed zone of treatment cell 1 using conduits 5 and 6, and microorganism can be added and withdrawn from the microbial growth zone within membrane 7 through conduits 8 and 9 respectively. Continuous addition of the microorganism is not necessary since it perpetuates itself.

The sewage effluent from this treatment cell can be further cleaned by re-cycling it through the same treatment cell or by passing it through one or more additional treatment cells which may contain the same or different microorganisms.

Microorganisms require a balance of nutrients for proper growth and if an imbalance of nutrients is present in the sewage or other waste water, the growth of the microorganism will cease whenever a necessary nutrient has been consumed to extinction. Since it may be desired to treat sewage and other contaminated waters to the extent that all contaminants which can be consumed as nutrients are substantially eliminated, it may be desirable to fortify the sewage or other contaminated water with one or more deficient nutrients (e.g. with certain salts or sugars) to thereby obtain a nutrient balance and permit all of the contaminants having nutrient value to be consumed to extinction.

Since non-photosynthetic microorganisms are preferably used in the practice of this invention, light is not ordinarily an essential element of the process and the equipment can be constructed simply and relatively inexpensively (e.g. treatment cells can be constructed of steel).

The rate of microbial growth may be altered by, for example, the raising or lowering of the temperature within the treatment cell (e.g. as by the combustion of products or by-products of the microbial growth cycle), by the application of pressure pulses to the sewage within the cell to facilitate the migration of contaminants through the porous barrier, by altering flow rates or the size of the porous barrier, and by the addition of chemicals to alter the pH. If desired, other techniques known to those skilled in the biochemical arts can also be used.

Turning now to FIG. 3, one form of multi-staged treatment cell is shown. In this apparatus, clarified sewage is caused to continuously flow in a serpentine path between a series of staggered baffles 12. These baffles are each separated by interposed porous tubes or chambers 13 which encase one or more species of microorganism. In this embodiment, drains 14 are shown for continuously or intermittently withdrawing microbial growth products from the system while means 15 are provided for continuously or intermittently introducing microorganisms into each of the porous tubes or chambers 13. Air inlets 16 (connected to a common manifold 17) and gas outlets 18 are also provided.

Turning now to FIG. 4, a plate and frame type of treatment cell is shown in exploded view. This multi-staged treatment cell is fabricated in the style of a plate and frame filter press. Supporting and terminal structure are not shown. In this form of treatment cell, a plurality of alternating frames 19 and 20 are used, each frame being separated from the next by a porous barrier or membrane 21. The space bounded by each frame 19 and its two adjacent membranes 21 is a feed zone. Similarly, the space bounded by each frame 20 and its two adjacent membranes 21 is a microbial growth zone. Frames of type 19 are provided with sewage inlet means 22 and sewage discharge means 23. If desired, discharge means 23 can be connected to inlet means 22 of the next succeeding frame 19 by conduit 24 to thereby direct the sewage (or other waste water) sequentially past a plurality of microbial growth zones. Frames 20 are equipped with means 25 for introducing air or oxygen into the microbial growth zones, means 26 for withdrawing microbial products, and means 27 for both introducing pure culture of microorganisms into the microbial growth zones and for controlling pressure within the microbial growth zone (e.g. as by venting gases).

Turning now to FIG. 5, a flow diagram is shown for a continuous treatment of sewage. According to the process shown in this diagram, raw sewage is passed through a screen 28 to remove large objects and then through a grinder 29 which reduces soft inclusions in the sewage to a small particle size. The resulting sewage is then passed into a primary settling tank or pond 30 where the rate of sewage flow is materially reduced, thereby permitting heavy particles such as sand and cinders to be removed from the stream by sedimentation and light particles (e.g. grease) to float and be removed by skimming. Clarified sewage from primary settling tank 30 is then passed to the settling tank or pond 31 where further settling is permitted. Flocculating agents such as alum and ferric chloride are used in the secondary settling tank 31 to aid in further clarification. The further clarified sewage is then withdrawn from the secondary settling tank 31 and passed through a series of treatment cells 32 and 33 (e.g. constructed as shown in any one of FIGS. 1–4) where the contaminants in the sewage are used as nutrients for microbial growth. The waste effluent from the final treatment cell 33 is then given some tertiary treatment 34 (e.g. chlorination to kill coliform bacteria), and finally discharged into some suitable waterway (e.g. a river).

The microbial growth products which are withdrawn from each of tretament cells 32 and 33 will be in the form of relatively dilute aqueous solutions. Although such products may have some commercial value as aqueous solutions, they will ordinarily be dried (e.g. as by evaporative concentration in evaporator 35 and spray drying or drum drying in dryer 36) to thereby obtain a dry product (e.g. yeast) useful as, for example, an ingredient in animal feed.

Numerous modifications or variations of the foregoing process will become apparent to those skilled in this art upon a reading of this disclosure. For example, the process of this invention can be used to supplement existing sewage treatment facilities instead of merely replacing or substituting for existing secondary treatment processes. Also, the sequence and nature of the overall sewage treatment process can be varied widely as known in the art. Also the process can be applied to the clean-up of contaminated waters other than sewage. For example, the process can be applied to the clean-up of polluted ponds and the removal of certain salts from sea water.

CONTAMINATED WATERS

The process of this invention can be used for the removal of any contaminant from water provided the contaminant can be utilized by the available microorganisms and the contaminant is present in a form which will penetrate the porous barrier being used. Thus any biologically acceptable contaminant can be removed by the proper selection of microorganism. The types of contaminated water that can be beneficially treated according to this invention include such naturally and artificially created impure waters as municipal sewage, industrial waste water, polluted ponds, salt solutions, and the like. The present process is particularly well adapted for use in the treatment of municipal sewage.

POROUS BARRIERS

Porous barriers selected for use in practicing this invention must have a pore size that is large enough to permit the contaminants in the water being treated to freely pass from the feed zone through the barrier into the microbial growth zone where the contaminants can be utilized in the microbial reproduction process. However, the pore size should also be small enough to prevent the reverse mass migration of the resulting microbial products from the microbial growth zone through the barrier into the feed zone. Membranes such as dialysis membranes having a pore size (i.e. pore diameter) as small as 1–100 angstroms in diameter are not well suited for use in this invention. Such small pores completely prevent or materially reduce the rate at which common sewage contaminants penetrate the porous barrier. In general, membranes having a pore size of from 0.01 up to 100 microns are needed for the practice of this invention. When the pore size is smaller than 0.01 micron, the contaminants do not satisfactorily pass through the barrier. Although the maximum pore size can vary considerably and is dependent upon such factors as the microorganisms size, the amount of leakage that can be tolerated, etc., it is generally true that when the pore size of the barrier is increased above 100 microns, the more common microbial products tend to leak through the barrier. When yeasts (e.g. *Candida utilis*) are used as the microorganism, a pore size of 0.1–5 microns is particularly desirable. When molds are used as the microorganism, a larger pore size can be used. Pore sizes of from 0.1–10 microns are particularly useful in conjunction with molds.

Any non-interferring porous barrier can be used if it has the desired pore size. Suitable barriers include any of the commercially available membranes or filter papers which are made by coating thin sheets of cellulosic paper, fiber glass, asbestos, woven and non-woven fabrics, and the like with various coating resins (e.g. Teflon, polypropylene, polyesters, various acrylic polymers, epoxy resins, melamine resins, etc.).

THE MICROORGANISMS

Any microorganism can be used in the process of this invention, although all do not serve with equal effectiveness. Microorganisms will ordinarily be selected after considering various factors including the type of contaminated water to be treated, the size of the microorganism in relation to the necessary pore size of the porous barrier, the prevailing conditions of temperature and pH, and the market for the microbial growth product. A variety of molds and yeasts can be used, with yeasts being the preferred microorganisms. Microorganisms having broad metabolic capabilities are of particular value in the treatment of municipal sewage which contains a wide variety of contaminants. Among the numerous microorganisms which can be used, the following are mentioned for the purpose of illustration:

| Microorganism: | ATCC |
|---|---|
| Bacillus cereus | 14579 |
| Bacillus subtilis | 6051 |
| Pseudomonos aeruginosa | 10145 |
| Serratia marcescens | 13880 |
| Flavobacterium arborescens | 4358 |
| Trichoderma (sp.) | 12668 |
| Geotrichum candidum | 4139 |
| Fusarium oxysporium | 7808 |
| Candida utilis | 9256 |
| Candida tropicalis | 1369 |

Of these microorganisms, *Candida utilis* is particularly preferred because of its broad metabolic activity, its rapid growth rate, and the recognized commercial value of the resulting yeast.

The broad metabolic spectrum of the yeast *Candida utilis* is illustrated by the following partial list of sources of nitrogen and carbon which can be utilized by that yeast.

| Nitrogen | Carbon |
|---|---|
| Ammonia | Dextrose |
| Ammonium compounds | Sucrose |
| Nitrates | Raffinose |
| Thiocyanates | Maltose |
| Oximes | Cellobiose |
| Amines | Trehalose |
| Acid amines | Melezitose |
| Urea | Inulin |
| Amino acids | Xylose |
| Peptides | Ethanol |
| Polypeptides | Glycerol |
| Imidazole compounds | Manitol |
| Pyridine compounds | Alpha methyl glucoside |
| Pyrimidine compounds | Salicin |
| Purine compounds | Potassium gluconate |
| | Sodium lactate |
| | Succinate |
| | Citrate |
| | Sortitol |
| | Sodium pyruvate |
| | Ethyl acetoacetate |

The present invention will be further understood by reference to the following examples. Unless otherwise indicated, all parts and percentages are by weight.

EXAMPLE 1

A laboratory sewage treatment system was constructed by assembling in series five cylindrical treatment cells of the general type shown in FIG. 1. Each was approximately 9¾ inches high and 2¾ inches in diameter. Each porous barrier was a membrane of tubular, pleated design as shown in FIG. 2. The membranes where obtained in tubular pleated form from the Pallflex Products Corporation. The pore size of this membrane (made of plastic coated cellulosic paper) was 0.8 micron. The size of each of the membrane tubes was sufficient to hold about 250 cc. of liquid and provide 3.4 square feet of exposed membrane surface.

The microorganism used in this example was *Candida utilis* (NRRL No. 1084) obtained from the Northern Regional Research Laboratories at Peoria, Ill. A culture of this yeast was grown for 48 hours in a shaker flask using the sewage effluent (i.e. sewage tailings) from a municipal trickling filter sewage treatment plant, fortified with 0.02 gram of dextrose per cc. of sewage, as the substrate. These sewage trailings were brownish-green in color and still had approximately 20% of the BOD that was present in the original untreated raw sewage (i.e. the present municipal treatment was 80% efficient). The estimated BOD of these sewage tailings was 50–60 mg./l.

The process of this invention was then demonstrated as follows. First, the laboratory system was flushed with fresh tap water as a hydrostatic test. Then, sewage tailings (the same as previously described) were pumped through the system to flush out the water. Then, 150 cc. of the forty eight hour shaker flask culture was added to each of the five cells. Next, air at the rate of approximately 150 cc. per minute was passed to the five cells (i.e. about 30 cc. per minute per cell). The system was allowered to equilibrate overnight to establish the culture within the tubular membranes. Then, the process was begun on a continuous basis. Sewage tailings, fortified with 0.5 gram of dextrose per cc. of sewage tailings, were passed through the cells in series at the rate of approximately 600 cc. per hour. The air flow rate of 150 cc. per minute (split among all five cells) was maintained. The operating temperature was about 90° F. and the pressure within each cell was substantially atmospheric. Aqueous microbial product was continuously withdrawn from each cell by gravity at the rate of approximately 25 cc. per hour per cell. This material was consolidated and then concentrated in a centrifuge to obtain a 12% yeast cream. The yeast cream was then dried on a rotary drum dryer to obtain a dry yeast which could be used as an ingredient in an animal feed. During this time, the sewage effluent from the fifth and final treating cell was discharged into a glass container. The process was continued for 96 hours. The water which was collected as effluent from the fifth treatment cell was clear enough to be mistaken for ordinary tap water and was markedly improved in appearance and odor from the sewage tailings used as a feed to this laboratory system. The efficiency of this system was estimated to be in excess of 90% based upon the initial BOD of the sewage tailings. Thus, by combining the present system with a conventional sewage treatment facility, it was possible to reduce the BOD by a factor of 98% below its initial level in the *raw* sewage.

What is claimed is:

1. The process of treating contaminated water to remove one or more contaminants from the water, said process comprising:
   (a) introducing contaminated water into a zone of treatment bounded in part by one surface of a porous barrier, said water being in contact with said one surface of the barrier;
   (b) introducing an aerobic non-photosynthetic microorganism into a separate microbial growth zone bounded in part by the opposite surface of said porous barrier, said microorganism being in liquid contact with the opposite surface of said barrier; the pores of said barrier having a pore size from 0.01 to 100 microns, said pores being large enough to permit said contaminant to pass freely from the contaminated water through the barrier to said microorganism and being small enough to prevent the reverse mass migration of the microorganism; and
   (c) extracting a contaminant from said contaminated water by the microbial utilization of said contaminant.

2. The process of claim 1 wherein the contaminated water is municipal sewage, with or without prior treatment.

3. The process of claim 1 wherein the contaminated water is treated sewage.

4. The process of claim 3 wherein the microorganism is a yeast and the pore size of said barrier is from 0.1 to 5 microns.

5. The process of claim 3 wherein the microorganism is *Candida utilis* and the pore size of said barrier is from 0.8 to 2 microns.

6. The process of claim 5 wherein one or more nutrients are intentionally added to said sewage to facilitate the extraction of said contaminant.

7. The process of claim 1 which involves exposing the contaminated water to the action of more than one microbial growth zone.

8. The process of claim 7 wherein different microorganisms are used in at least two of the microbial growth zones.

9. The process of claim 1 wherein microbial growth product is removed from said microbial growth zone and dried.

References Cited

UNITED STATES PATENTS

| | | | |
|---|---|---|---|
| 2,715,795 | 8/1955 | Pallotta et al. | 210—321X |
| 3,186,917 | 6/1965 | Gerhardt et al. | 195—115X |
| 3,398,088 | 8/1968 | Okey | 210—23X |
| 3,425,839 | 2/1969 | Pinnegar | 195—115X |

FOREIGN PATENTS

| | | | |
|---|---|---|---|
| 1,256,076 | 2/1961 | France | 210—17 |

MICHAEL ROGERS, Primary Examiner

U.S. Cl. X.R.

99—2; 195—115; 210—15, 23, 321